Madlyn Lees, Administratrix
for the Estate of
INVENTOR.
Gerald M. Lees
BY Horton, Davis,
Brewer & Brugman
Attys Madlyn Lees, Administratrix
for the Estate of
INVENTOR.
Gerald M. Lees
BY Horton, Davis,
Brewer & Drugman
Attys

United States Patent Office 3,069,868
Patented Dec. 25, 1962

3,069,868
FLAKE-ICE MAKING MACHINES
Gerald M. Lees, deceased, late of 5989 W. Lake St., Chicago, Ill., by Madlyn T. Lees, Chicago, Ill., administratrix
Filed June 28, 1961, Ser. No. 120,444
6 Claims. (Cl. 62—347)

This invention relates to an improved flake-ice making machine having a number of distinct advantages and benefits not heretofore obtainable in such machines.

Flake-ice has a number of uses and is of particular utility in the preservation of various foods. It is made by applying water to a freezing surface and thereafter harvesting the thin layer or continuous sheet of ice formed thereon. For a number of years such ice has been produced by harvesting it from the continuous sheet of ice formed upon a single surface of a freezing cylinder. Recently a machine was developed which for the first time utilized both major surfaces of a freezing cylinder as ice producing surfaces and which introduced other theretofore unknown advantages and benefits as well. U.S. application Serial No. 753,829, filed on August 7, 1958, copending herewith, describes that invention in detail. Although that invention has many advantages not obtainable with prior art machines, there are a number of features thereof which are susceptible of improvement. Accordingly it is the principal object of the present invention to provide a vastly improved flake-ice making machine having multiple (at least two) ice-sheet forming surfaces therein and having a substantially greater capacity than present machines of the same size.

It is a further object of this invention to provide a machine which requires minimum down time, which of course increases the operating time, hence the capacity of flake-ice making machines of any given size.

It is a still further object of this invention to provide a machine in which the useful ice-producing area of a freezing cylinder of given dimensions is increased by a substantial amount.

Still further objects of this invention are to provide vastly improved means in double-sided flake-ice making machines for catching water which drips off the freezing drum and to provide improved means for preventing the commingling of said water and the flakes of ice harvested from the machine. Another object of this invention is to provide substantially simpler water distributing means for a "double-sided" flake-ice making machine than was heretofore known.

In the earlier "double-sided" flake-ice making machines the refrigerant lines to the freezing cylinder were located at the bottom of those machines. Those lines accumulated substantial deposits of ice due to frosting, due to water dripping thereon from the freezing cylinder and due to some of the flake-ice falling on those lines being retained in the "build-up." This "build-up" not only interfered with the free fall of water and flake-ice into their proper receptacles, but it also hampered the operation of the machine to such an extent that frequent periods of down time were required to remove the accumulated frost and ice and to restore the machine's efficient operation. The "build-up" also increased the possibility of contamination of the flake-ice which is manifestly undesirable since cleanliness is of the utmost importance in flake-ice production for at least one of the principal uses (food packing) to which such ice is put. In accordance with the present invention, it is possible to have the refrigerant lines located at the top of the machine. While frosting has not been eliminated, the difficulties attendant "build-up" on those lines have been completely eliminated.

Furthermore, the invention described herein provides a machine which gives an increase in available surface area on a freezing cylinder, so that as much as a 15% increase in yield from a cylinder of a given size can be realized over that which was possible with prior art machines. That has been made possible by making available the entire lower surface of the freezing cylinder, including the bottom thereof, for the formation of ice sheets from which flake-ice may be harvested, and by providing means for harvesting ice, not only from the entire side surfaces of the cylinder, but also from the bottom thereof. This also results in more economical operation by making more efficient use of the refrigerating medium.

Other objects and advantages of this invention will be apparent from the following description and drawings of which:

Figure 1:
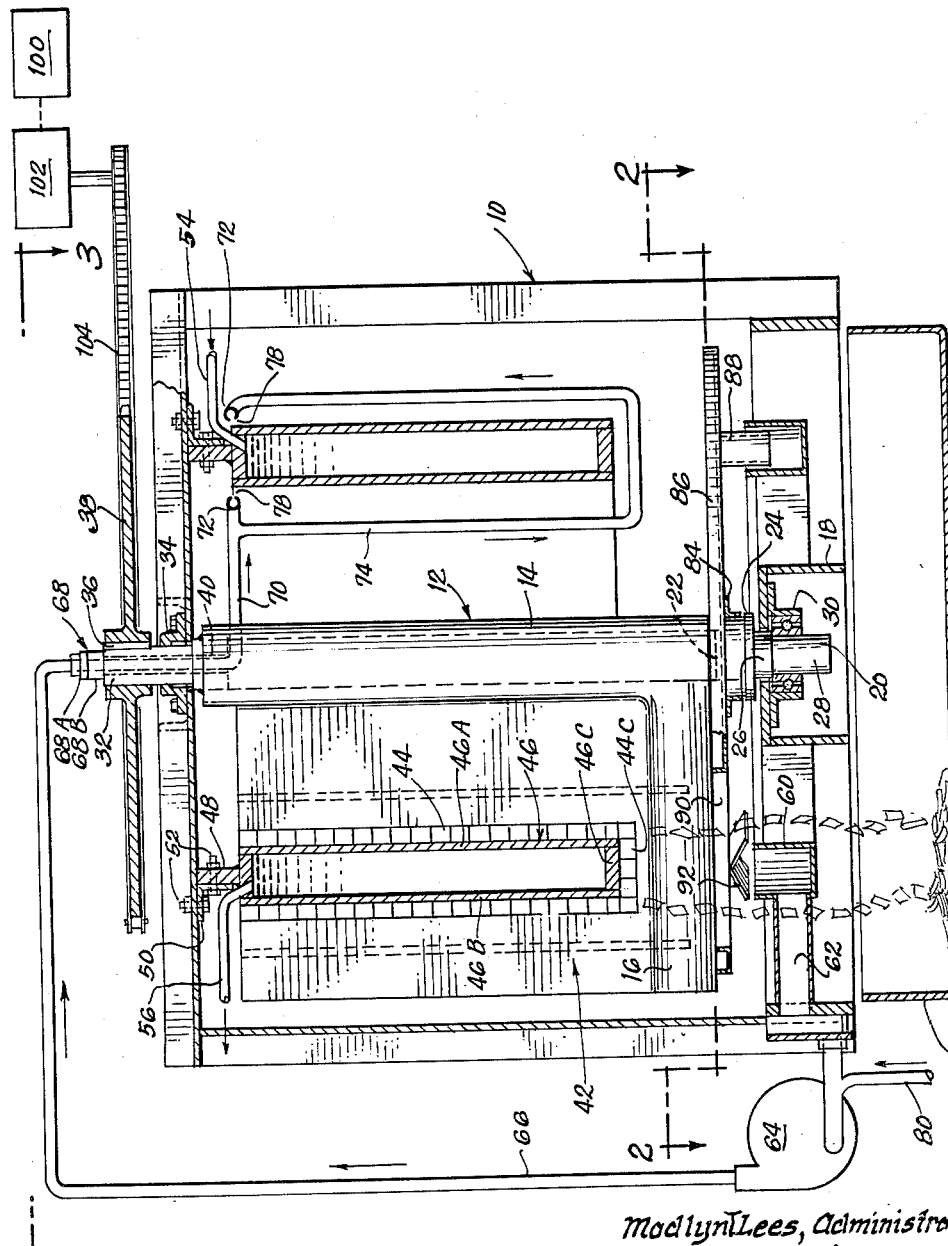
FIGURE 1 is a vertical sectional view taken through an ice machine embodying my invention.

Referring now to FIGURE 1, on frame 10 there is mounted a rotor assembly 12. The rotor assembly consists in part of a vertical tubular member 14 and a horizontal tubular member 16, the two members being rigidly attached to each other as by welding. The lower extremity of the vertical member 14 is adapted to receive a plug member 20, said plug member 20 being rigidly attached to the rotor in any convenient manner, such as by welding. The plug 20 consists of an upper segment 22, which fits inside the rotor member 14, a collar 24, a lower segment 26, which is of lesser diameter than the collar segment, and a bottom segment 28 which is of lesser diameter than segment 26. Segments 26 and 28 extend below frame member 18 upon which frame member is mounted, by any suitable fastening means, bearing 30. The bearing is so arranged, that both radial displacement of the plug, hence the rotor, as well as downward movement of the rotor assembly is prevented. This is most readily seen in FIG. 1.

At the top of rotor member 14 there is another plug 32 which fits inside member 14 and which is rigidly attached thereto. The upper end of plug 32 has a key 36 which is adapted to mate within a drive sprocket 38. Plug 32 has a centrally located opening 40 throughout its entire extent. Bearing 34 surrounds the central upper portion of plug 32, said bearing being attached to frame member 10 to prevent radial movement of both plug 32 and rotor member 14 and to restrain axial movement as well.

Rotor assembly 12 is driven in any convenient manner, such as by motor 100, a suitable gear mechanism 102, chain 104 and drive sprocket 38.

Rigidly attached to rotor assembly 12 is U-shaped blade carrier 42. Blades 44, 44C, and the means for attaching such blades to the three arms of the blade holder 42 may be any convenient structure, one such structure and means being shown in U.S. application No. 753,829, filed August 7, 1958 and copending herewith. The blades extend not only along the vertical arms of the U-shaped blade holder, but also along the horizontal or bottom arm of the U-shaped holder shown in FIGURE 1 as blades 44C. All of the blades lie in the same radial plane.

Thus it is seen that the blades are arranged so that they will remove ice from sides 46A and 46B as well as from the bottom surface 46C of tubular hollow freezing cylinder 46. Freezing cylinder 46 may be of any material suitable for the service intended. All of its surfaces are machined to provide suitable ice forming surfaces. Cylinder 46 itself is suspended from frame 10 at spaced points in any convenient manner such as by flanges 48, angles 50, and nut and bolt connecting means 52. Refrigerant for the freezing cylinder is supplied and the gas removed from cylinder 46 at spaced points 54 and 56, respectively, at such a rate as to maintain the surfaces of the cylinder at a temperature proper for the formation of the desired ice. As a result of this arrangement of elements both supply line 54 and exhaust line 56 can be at the top of the machine, which is contrary to the present practice.

Beneath rotor assembly 12 and attached to frame 10 is water gutter 60 which extends around the entire periphery of the ice making machine. The water collected in gutter 60 is removed via conduit 62 and is recirculated to the freezing surfaces of the freezing cylinder through pump 64, conduit 66, rotating joint 68, conduit 70 and water distribution conduits 72. In this manner all of the water that was chilled but not frozen may be reused, and the most economical utilization of the refrigerant is effected.

It should be mentioned that joint 68 is of a construction that maintains a seal between its rotatable part 68B and non-rotatable part 68A when the machine is in operation.

Water is applied to freezing surfaces 46A, 46B, and 46C of cylinder 46 from conduits 72. These conduits extend around approximately 270° (at least approximately 200°) of the cylinder, from immediately to the rear of the blade holder 42 to sufficiently far in front of the blades and the ice removal zone so that substantially no free water remains upon the cylinder's freezing surfaces where the flake-ice is being harvested. That provides the desired dry flake-ice. The water distribution means include interconnecting conduit 74 and water distribution conduits 72. Conduits 72 have a plurality of spaced openings 78 therein through which the water is applied to at least approximately 60% of each of the vertical freezing surfaces under positive pressure and to the same area of the bottom freezing surface as the water drains to the bottom of the cylinder. Sufficient make-up water is added to the recirculating water, through conduit 80, to supply the freezing surfaces with the necessary or desired quantity of water.

Figure 3:
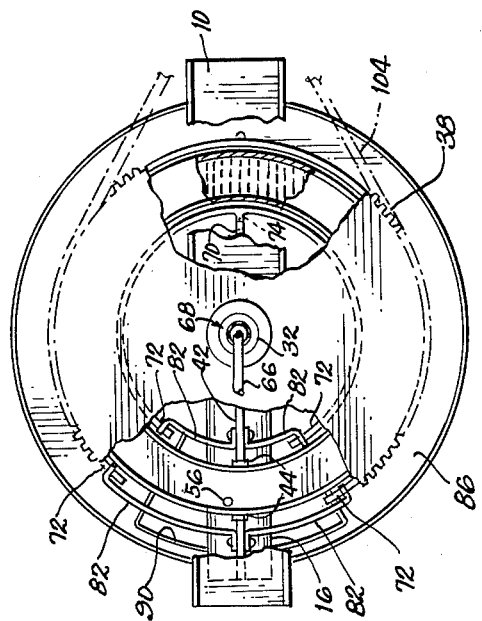
FIG. 3 is a top plan view of the machine of FIG. 1, cut away in part to show certain portion thereof.
Figure 2:
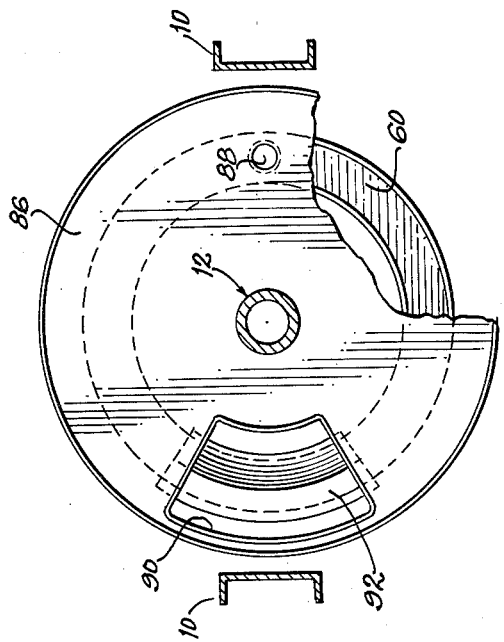
FIG. 2 is a lower plan view taken along line 2—2 of FIG. 1.

The water distribution means is supported by conduit 70 and more especially by brace means 82 which are mounted upon blade holder 42 as is best shown in FIG. 3.

Also attached to rotor 12, as by connecting means 84 is water catch pan 86 which collects water as it drips from freezing surfaces 46A, 46B and 46C. The pan is mounted so that the water drains toward drain conduit 88. Conduit 88 is arranged to travel within water gutter 60 as rotor assembly 12 rotates. It is gutter 60 from which water is removed through conduit 62 to be recirculated.

As blades 44 and 44C remove the ice from the continuous sheets which have formed upon the freezing cylinder 46, the dry flake-ice drops. The flake-ice is kept separate from the water draining from the drum surface by providing an opening 90 in the water catch pan or water catching means 86. Opening 90 is so dimensioned that the flake-ice will drop therethrough. To prevent the fall of the flake-ice into gutter 60, ice shield 92 is either attached to the underside of pan 86 or is attached to rotor member 16 so that, as it falls, the flake-ice is deflected from the gutter and falls instead directly into storage hopper or flake-ice collecting means 94 from which the ice may be taken as needed.

The operation of the machine is as follows: Refrigerant is admitted through conduit 54 to reduce the temperature of the freezing cylinder 46 to an operative level. Through its driving mechanism, rotor assembly 12 and all that it carries begins to rotate. Water is supplied to the water distribution means through conduit 66, non-rotatable joint part 68A, rotatable joint 68B, and conduit 70. Water distribution means 72, which also rotate with the rotor assembly, apply water to the surfaces of cylinder 46, part of the water freezing in continuous sheets upon the surfaces, excess water dripping into pan 86. The excess water is channeled through conduit 88 which conduit travels within non-rotating gutter 60. From gutter 60 water is recycled to the water distribution means through conduit 62, pump 64, and conduit 66, make-up water being added through conduit 80.

Harvesting blades 44 and 44C, held to rotor assembly 12 by U-shaped blade holder 42, remove the flake-ice from freezing cylinder 46. The ice falls through opening 90 in pan 86, is deflected from gutter 60 by shield 92, and is collected in hopper 94 or any other suitable means to be removed as needed.

While specific structures which embody the present invention have been shown and described, it is to be understood that the scope of this invention is to be limited only by the claims appended hereto. Those claims are:

1. A flake-ice making machine comprising a frame, a vertical tubular hollow freezing cylinder suspended from said frame, said cylinder having concentric inside and outside freezing surfaces and a bottom freezing surface, means for distributing water to more than approximately 60% of each of said freezing surfaces, separate means located at the top of the freezing cylinder for introducing refrigerant to and removing spent refrigerant from the interior of said freezing cylinder, a U-shaped member having one arm thereof adjacent each of the freezing surfaces, means for rotatably supporting said member, means for rotating said member around said freezing cylinder, flake-ice removal means carried by each of the arms of said U-shaped member, said flake-ice removal means being maintained in flake-ice removing relation to each of said freezing surfaces, water recirculating means, flake-ice collecting means, means for catching substantially all of the water which drops from the surfaces of said cylinder and for directing that water to said water recirculating means, said water catching means defining means through which the flake-ice harvested from the freezing surfaces may fall, and means cooperating with said water catching means and said means through which the flake-ice harvested may fall which prevents the intermixture of the falling water and the flake-ice as they fall from the surfaces of the freezing cylinder into their respective catching and collecting means.

2. A flake-ice making machine comprising a frame, a vertical tubular hollow freezing cylinder suspended from said frame, said cylinder having concentric inside and outside freezing surfaces and a bottom freezing surface, means for distributing water to more than approximately 60% of each of said freezing surfaces, separate means located at the top of the freezing cylinder for introducing refrigerant to and removing spent refrigerant from the interior of said freezing cylinder, a U-shaped member having one arm thereof adjacent each of the freezing surfaces, means for rotatably supporting said member, means for rotating said member around said freezing cylinder, flake-ice removal means carried by each of the arms of said U-shaped member, said flake-ice removal means being maintained in flake-ice removing relation to each of said freezing surfaces, said means for distributing water comprising rotatably mounted interconnected conduits, a first of said conduits being adjacent the top of the inside freezing surface, a second of said conduits being adjacent the top of the outside freezing surface, each of said first and second conduits extending along the circumference of the freezing cylinder and the top of the respective adjacent freezing surfaces for at least 200°, each of said first and second conduits having spaced perforations in the walls adjacent the freezing surfaces through which water is applied to said adjacent freezing surface, and said means for rotatably supporting said U-shaped member being arranged to rotatably support said water distributing means as well.

3. The flake-ice making machine defined in claim 2, further characterized by water recirculating means, flake-ice collecting means, means for catching substantially all of the water which drops from the surfaces of said cylinder and for directing that water to said water recirculating means, said water catching means defining means through which the flake-ice harvested from the freezing surfaces may fall, and means cooperating with said water catching means and said means through which the flake-ice harvested may fall which prevents the intermixture of the falling water and the flake-ice as they fall from the surfaces of the freezing cylinder into their respective catching and collecting means.

4. A flake-ice making machine comprising a frame, a vertical tubular hollow freezing cylinder suspended from said frame, said cylinder having multiple freezing surfaces, means for distributing water to more than approximately 60% of each of said freezing surfaces, separate means located at the top of the freezing cylinder for introducing refrigerant to and removing spent refrigerant from the interior of said freezing cylinder, a U-shaped member straddling the cylinder, means for rotatably supporting said U-shaped member, means for rotating said member around said freezing cylinder, flake-ice removal means carried by said U-shaped member, said flake-ice removal means being so arranged and so positioned that they are maintained in flake-ice removing relation to said multiple freezing surfaces, water recirculating means, flake-ice collecting means, means for catching substantially all of the water which drops from the surfaces of said cylinder and for directing that water to said water recirculating means, said water catching means defining means through which the flake-ice harvested from the freezing surfaces may fall, and means cooperating with said water catching means and said means through which the flake-ice harvested may fall which prevents the intermixture of the falling water and the flake-ice as they fall from the surfaces of the freezing cylinder into their respective catching and collecting means.

5. A flake-ice making machine comprising a frame, a vertical tubular hollow freezing cylinder suspended from said frame, said cylinder having multiple freezing surfaces, means for distributing water to more than approximately 60% of each of said freezing surfaces, separate means located at the top of the freezing cylinder for introducing refrigerant to and removing spent refrigerant from the interior of said freezing cylinder, a U-shaped member straddling the cylinder, means for rotatably supporting said U-shaped member, means for rotating said member around said freezing cylinder, flake-ice removal means carried by said U-shaped member, said flake-ice removal means being so arranged and so positioned that they are maintained in flake-ice removing relation to said multiple freezing surfaces, said means for distributing water comprising rotatably mounted interconnected conduits, a first of said conduits being adjacent the top of one of the freezing surfaces, a second of said conduits being adjacent the top of another of the freezing surfaces, each of said first and second conduits extending along the circumference of the freezing cylinder and the tops of the respective adjacent freezing surfaces for at least 200°, each of said first and second conduits having spaced perforations in the walls adjacent the freezing surfaces through which water is applied to said adjacent freezing surface, said means for rotatably supporting said U-shaped member being arranged to rotatably support said water distributing means as well.

6. The flake-ice making machine defined in claim 5, further characterized by water recirculating means, flake-ice collecting means, means for catching sustantially all of the water which drops from the surfaces of said cylinder and for directing that water to said water recirculating means, said water catching means defining means through which the flake-ice harvested from the freezing surfaces may fall, and means cooperating with said water catching means and said means through which the flake-ice harvested may fall which prevents the intermixture of the falling water and the flake-ice as they fall from the surfaces of the freezing cylinder into their respective catching and collecting means.

References Cited in the file of this patent
UNITED STATES PATENTS

| | | |
|---|---|---|
| 1,623,535 | Ferguson | Apr. 5, 1927 |
| 2,145,331 | Arensberg | Jan. 31, 1939 |
| 2,299,414 | Spiegl | Oct. 20, 1942 |
| 2,440,397 | Erickson | Apr. 27, 1948 |
| 2,986,902 | Michener | June 6, 1961 |